United States Patent [19]

Schrey et al.

[11] Patent Number: 5,746,164
[45] Date of Patent: May 5, 1998

[54] METHOD OF DETERMINING VALVE CONTROL TIMES FOR A MAXIMUM CYLINDER CHARGE ON A PISTON-TYPE INTERNAL COMBUSTION ENGINE

[75] Inventors: Ekkehard Schrey; Guenter Schmitz, both of Aachen, Germany

[73] Assignee: FEV Motorentechnik GmbH & Co. KG, Germany

[21] Appl. No.: 708,709

[22] Filed: Sep. 5, 1996

[30] Foreign Application Priority Data

Sep. 20, 1995 [DE] Germany ............... 195 34 876.1

[51] Int. Cl.$^6$ ................................... F02D 41/02
[52] U.S. Cl. ........................ 123/90.11; 123/672
[58] Field of Search .................. 123/90.11, 672, 123/673

[56] References Cited

U.S. PATENT DOCUMENTS

| | | | |
|---|---|---|---|
| 4,782,798 | 11/1988 | Jones | 123/90.11 |
| 4,945,870 | 8/1990 | Richeson | 123/90.11 |
| 4,995,351 | 2/1991 | Ohkubo et al. | 123/90.11 |
| 5,190,013 | 3/1993 | Dozier | 123/90.11 |
| 5,419,301 | 5/1995 | Schechter | 123/673 |

FOREIGN PATENT DOCUMENTS

3024109A1  1/1982  Germany.

*Primary Examiner*—Weilun Lo
*Attorney, Agent, or Firm*—Spencer & Frank

[57] ABSTRACT

A method is provided for determining valve control times for a maximum charge for cylinders in a piston-type internal combustion engine provided with fuel injection, lambda sensor control and electromagnetically actuatable cylinder valves. The method includes setting the "intake closes" control moment to a preliminary value on all gas intake valves of the engine; changing continuously the "intake closes" control moment on the gas intake valves at least one cylinder while maintaining a constant engine rpm and determining, with the lambda sensor control at $\lambda=1$, one of (1) a longest fuel injection duration and (2) a leanest operation at a constant injection duration; and storing the determined "intake closes" control moments at respective rpm's in a performance characteristic of an engine control for achieving a maximum charge in the cylinders at the respective rpm's.

1 Claim, 2 Drawing Sheets

5,746,164

METHOD OF DETERMINING VALVE CONTROL TIMES FOR A MAXIMUM CYLINDER CHARGE ON A PISTON-TYPE INTERNAL COMBUSTION ENGINE

CROSS-REFERENCE TO RELATED APPLICATIONS

This application claims the right of priority of German application DE 195 34 876.1 filed in Germany on Sep. 20, 1995, the disclosure of which is incorporated herein by reference.

BACKGROUND OF THE INVENTION

In piston-type internal combustion engines having cam-controlled cylinder valves, the cylinder charge, i. e., the air mass in the cylinder for each operating cycle, is directly proportional to the angle of the throttle valve. In contrast, electromagnetically actuated cylinder valves for piston-type internal combustion engines are known, for example, from German Patent No. 3,024,109, in which the cylinder valves are fully variable because they are actuated electronically. In such electromagnetically actuated cylinder valves, the cylinder charge is a function of the control time parameters of the cylinder valves, namely of the succession in time of the control time parameters "intake opens", "intake closes", "exhaust opens" and "exhaust closes." With respect to the full variability allowed by electromagnetic actuation, it is possible during this process to greatly influence the cylinder charge by way of a corresponding time sequence of the control times and also by an overlapping of the control time intervals. Here, the control time (moment) parameter "intake closes" has the greatest influence. Moment in this context means "point in time."

Because of the great number of parameters that influence the cylinder charge in piston-type internal combustion engines having fully variable, electromagnetically actuatable cylinder valves, it is normally quite complex to obtain a maximum cylinder charge for a given operating point to achieve in each case a maximum torque.

SUMMARY OF THE INVENTION

It is an object of the invention to provide a method by which it is possible to detect valve control times for a maximum cylinder charge for the respective cylinders by utilizing an existing lambda sensor control.

The above and other objects are accomplished according to the invention by the provision of a method for determining valve control times for a maximum charge for cylinders in a piston-type internal combustion engine provided with fuel injection, lambda sensor control and electromagnetically actuatable cylinder valves, wherein the valve control times include at least an "intake closes" control moment, the method comprising the steps of: setting the "intake closes" control moment to a preliminary value on all gas intake valves of the engine; changing continuously the value of the "intake closes" control moment of the gas intake valve of at least one cylinder at respectively constant engine rpm's and determining at the respective rpm's, with the lambda sensor control at $\lambda=1$, one of (1) a longest fuel injection duration and (2) a leanest operation at a constant injection duration; and storing the determined "intake closes" control moments at respective rpm's in a performance characteristic of an engine control for achieving a maximum charge in the cylinders at the respective rpm's.

If a piston-type internal combustion engine is operated in this manner via the control as a function of the exhaust (lambda) sensor for the entire rpm range, a complete performance characteristic for the control of the cylinder valves can be created by means of which a maximum charge of the cylinders is ensured for all rpm's or rpm ranges. Preferably, the method is practiced such that all gas intake valves of the engine are run through with a continuously changing "intake closes" control moment for the respectively predetermined rpm's.

Within the meaning of the present invention, the term "lambda sensor control" relates to the conventional control in which an exhaust sensor functions as a so-called "skip sensor" and the control has as its objective to maintain the value $\lambda=1$ for all operating ranges, if possible. The term "lambda sensor control" also relates to an exhaust sensor which functions as a so-called leanness sensor. "Leanness sensor" within the meaning of the invention means any sensor whose output signal can be utilized as information on the stoichiometric mixing ratio of air and fuel and thus on the "leanness". Therefore, it is entirely possible to also use such a "leanness sensor" in the range of rich mixtures.

But it is also possible to operate the individual cylinders on a piston-type internal combustion engine successively. Here, the control parameter "intake closes" is also correspondingly set for all cylinders, but then the control parameter "intake closes" is only changed for one cylinder until the maximum injection duration, i. e., the maximum injection quantity or the leanest operation for the respective cylinder can be determined via the lambda sensor control. If the maximum fuel injection duration is determined, i. e., the cylinder receives the maximum fuel quantity, or if the leanest operation is determined, then the determined control moment "intake closes" can be recorded for the respective cylinder. This method is carried out successively for all cylinders so that in this manner also construction-related deviations in the maximum degree of charge of the individual cylinders can be detected by way of individually fixing the control parameter "intake closes" for the maximum charge of the respective cylinder.

The invention is explained in greater detail below in conjunction with the accompanying drawings.

DETAILED DESCRIPTION OF THE PREFERRED EMBODIMENTS

Figure 1A:
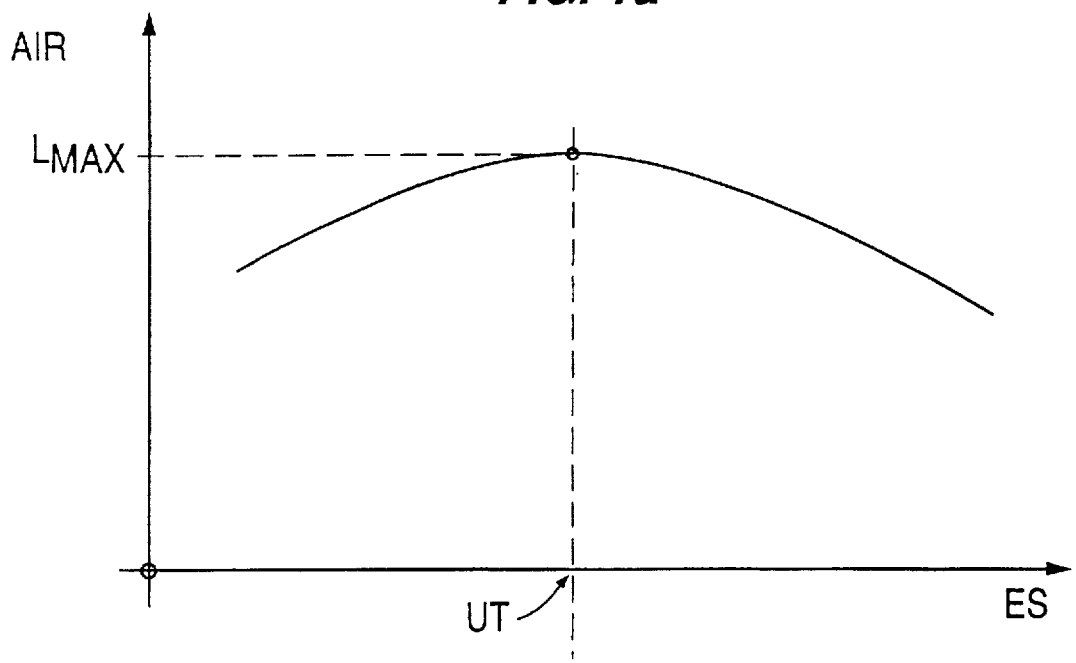
FIGS. 1a and 1b are graphs showing, respectively, the dependency of the air quantity in a cylinder on the control parameter "intake closes" and the associated fuel quantity for $\lambda=1$.

FIG. 1a illustrates the air charge in a cylinder as a function of the "intake closes" control moment ES. The maximum air volume $L_{max}$ is present in the cylinder if the gas intake valve closes at moment UT when the piston in the respective cylinder has reached the bottom dead center.

Figure 1B:
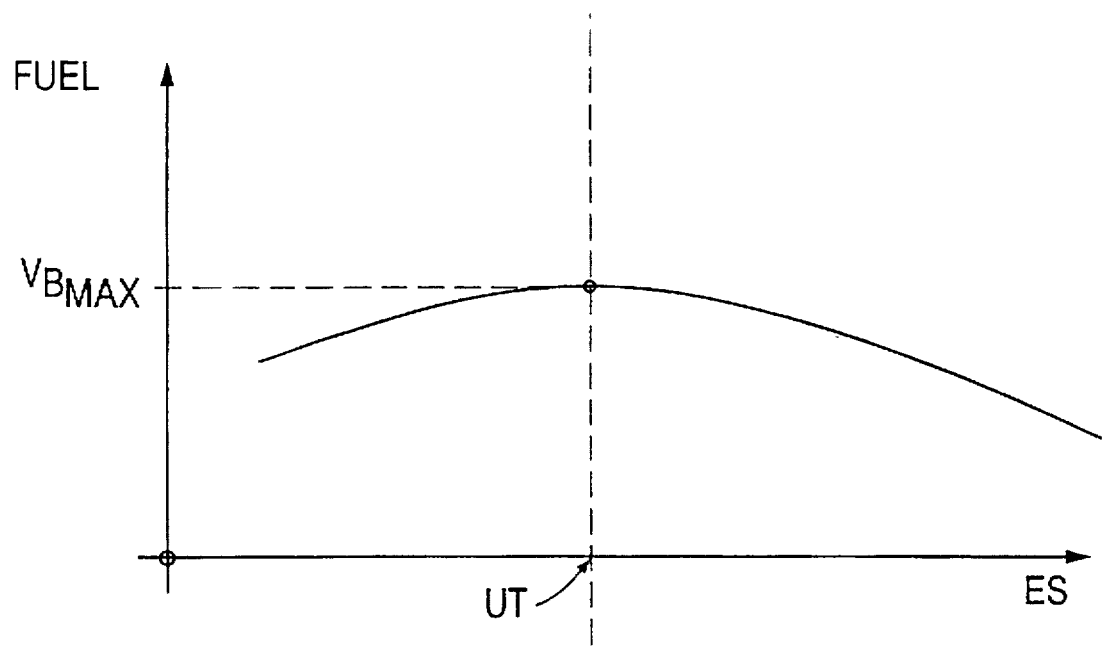

If, as a function of the lambda sensor control, the fuel quantity is controlled such that the condition $\lambda=1$ is always complied with, it then follows from the longest injection duration determined, which is proportional to the maximum injected fuel quantity, that the gas intake valve must be closed at time UT to obtain the maximum charge $U_{Bmax}$ in the cylinder. This is depicted in FIG. 1b.

Figure 2:
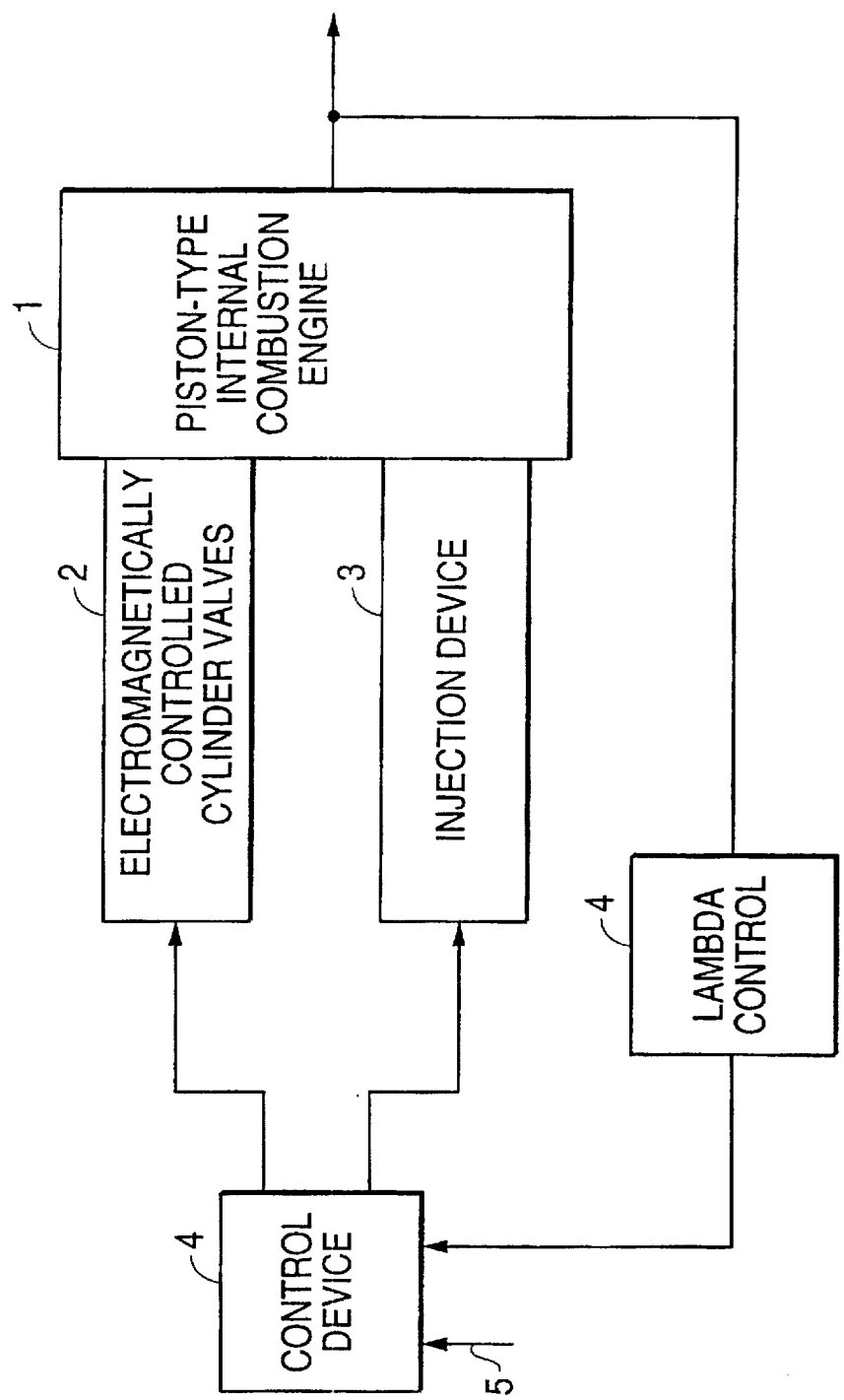
FIG. 2 is a block circuit diagram for a control for implementing the method according to the invention.

In the block diagram of FIG. 2, there is shown a control for implementing the method according to the invention. A piston-type internal combustion engine 1 is provided with fully variable, electromagnetically actuatable cylinder valves 2 and with an injection device 3. Although not shown, a separate injection device is allocated to each cylinder.

The cylinder valves, namely the gas intake valves and the gas exhaust valves, are actuated via a control device 4 to which the remaining operating parameters (desired load, rpm, temperature, etc.) are supplied for a normal operation as represented by arrow 5.

Control device 4 is provided with a performance characteristic memory in which are deposited the control times for the cylinder valves and for the injection device at all operating rpm's or for operating rpm ranges. Thus, it is possible to program the performance characteristic memory so that for each rpm or for each rpm range the "intake closes" control moment is predetermined such that a maximum charge of the cylinders and thus a maximum torque is always available. For this purpose, a lambda control 6 is superimposed onto control device 4.

According to the method of the invention, all cylinders of the piston-type internal combustion engine are set so as to be identical with respect to the control time parameter "intake closes." The "intake closes" control moment is then changed via the control device 4 and the duration of the injection of the injection device 3 is detected at the same time. The "intake closes" control moment is then determined for an optimum charge at respectively defined rpm's in connection with a control of injection device 3 as a function of lambda sensor control 6 so that the "intake closes" control moment determined in this manner can be deposited in the performance characteristic memory of the control device 4. This method is carried out according to the predetermined performance characteristic data for the entire rpm range of the engine, with it being possible to carry out this method for the engine as a whole or respectively for an individual cylinder, which cylinders are then "run through" in this manner one after the other. These performance characteristics are then utilized during a driving operation.

For a lambda sensor control with leanness sensor the method is applied accordingly.

Once the maximum degree of charge has been determined via the control parameter "intake closes," other control parameters that are relevant for the operation of the piston-type internal combustion engine can also be optimized with respect to a maximum charge by way of the same procedure.

An iterative method is even conceivable, wherein after the optimization of the remaining control parameters, the control parameter "intake closes" is optimized again and then, in turn, the other control parameters are optimized. The optimum setting of the piston-type internal combustion engine is accomplished if from one iteration to another no improvements or no meaningful improvements are achieved.

The invention has been described in detail with respect to preferred embodiments, and it will now be apparent from the foregoing to those skilled in the art that changes and modifications may be made without departing from the invention in its broader aspects, and the invention, therefore, as defined in the appended claims is intended to cover all such changes and modifications as fall within the true spirit of the invention.

What is claimed is:

1. A method for determining valve control times for a maximum charge for cylinders in a piston-type internal combustion engine provided with a fuel injection, a lambda sensor control and electromagnetically operable cylinder valves, and with an engine control which is connected to the lambda sensor control for actuating the fuel injection and for actuating the electromagnetically operable cylinder valves which include gas intake valves, wherein the gas intake valves include an "intake closes" control moment, the method comprising the steps of, in the engine control setting the "intake closes" control moment to a preliminary value on all gas intake valves of the engine;

changing continuously the "intake closes" control moment of the gas intake valve of at least one cylinder while maintaining a constant engine rpm until, with the lambda sensor control at $\mu=1$, one of (1) a longest fuel injection duration and (2) a leanest operation at a constant injection duration is determined; and storing the determined "intake closes" control moments at respective rpm's in a performance characteristic of the engine control for achieving a maximum charge in the cylinders at the respective rpm's.

* * * * *